July 22, 1969     R. D. LACOE, JR     3,457,008
TITLE VIEWER
Filed May 15, 1967     2 Sheets-Sheet 1
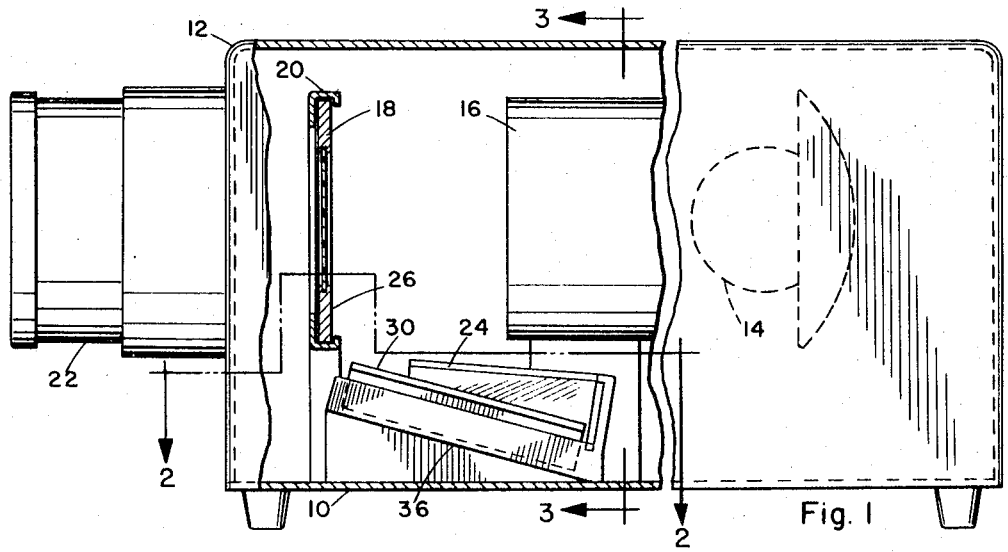
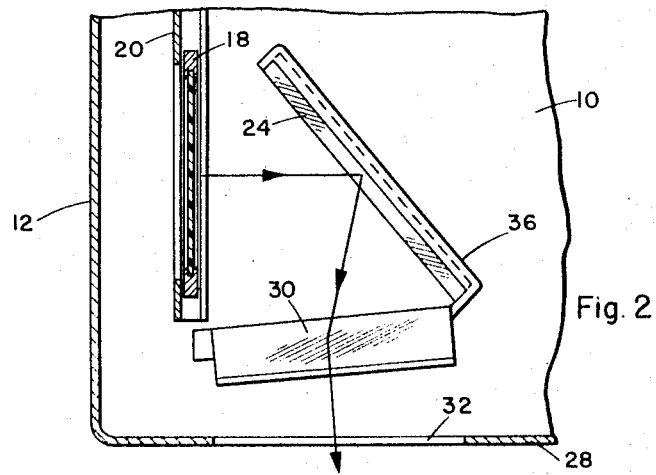
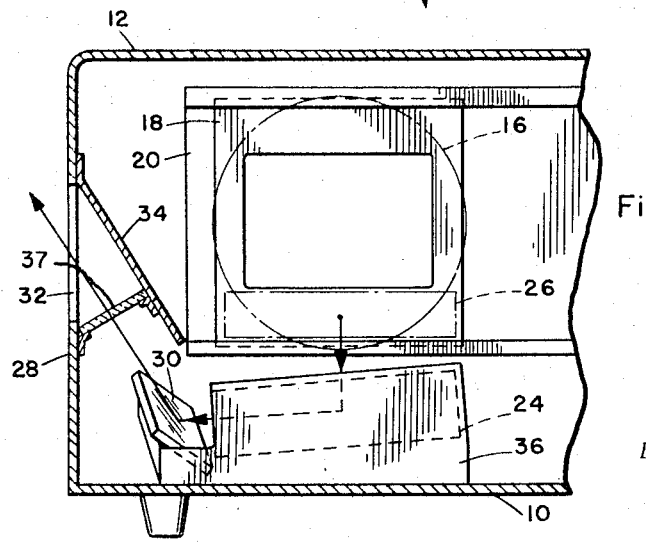
INVENTOR.
RALPH D. LACOE, JR.
BY Knox & Knox July 22, 1969 R. D. LACOE, JR 3,457,008
TITLE VIEWER
Filed May 15, 1967 2 Sheets-Sheet 2

INVENTOR.
RALPH D. LACOE, JR.
BY
Knox & Knox

United States Patent Office 3,457,008
Patented July 22, 1969

3,457,008
TITLE VIEWER
Ralph D. Lacoe, Jr., 2436 Presidio Drive,
San Diego, Calif. 92103
Filed May 15, 1967, Ser. No. 643,009
Int. Cl. G03b *21/26, 21/28*
U.S. Cl. 353—21                                    2 Claims

ABSTRACT OF THE DISCLOSURE

An optical system is incorporated into a slide projector to permit reading, by the operator, of descriptive matter carried on the frame of a slide during the actual projection of that slide. The optical system uses the existing illumination in the projector and does not interfere with normal operation. Light emanating from the light source strikes the frame of the slide, is reflected therefrom via a plurality of mirrors through a light intensity reducing filter to the viewing opening, whereby the descriptive matter carried on the frame is read by the operator.

BACKGROUND OF THE INVENTION

The invention relates to slide projectors and specifically to means for viewing the title or descriptive matter carried on a slide at the time of projection.

When projecting slides it is usually desirable to identify or describe the picture for the viewers and many slides have such descriptive matter printed or written on a border portion of the frame. When slides are inserted in the projector manually, each can be inspected first, but the light level near the projector is usually low and small printing is difficult to read. When magazines are used, particularly those for automatic projectors, it is impractical to remove each slide prior to projection to determine the subject matter. Projectors have been developed in which each slide can be previewed by the projectionist before reaching the actual projection position. However, only the picture itself is visible and is normally backlighted by a separate low level light source.

SUMMARY OF THE INVENTION

The addition to a projector described herein provides the projectionist with a clear view of a titled or descriptive border portion of the slide actually in the projection position, so that the descriptive matter on the slide frame can be related to the picture being viewed on the screen. The optics are very simple and adaptable to a variety of types of projectors, the existing light source in the projector being used without modification or obstruction. Location of the title viewing position may be arranged to suit the particular projector and slide feed arrangement, so that the operator has a convenient view.

BRIEF DESCRIPTION OF THE DRAWINGS

FIGURE 1 is a side elevation view of a typical projector, partially cut away to show the installation of one form of the title viewer;

FIGURE 2 is a sectional view taken on line 2—2 of FIGURE 1;

FIGURE 3 is a sectional view taken on line 3—3 of FIGURE 1;

Similar characters of reference indicate similar or identical elements and portions throughout the specification and throughout the views of the drawings.

DESCRIPTION OF THE PREFERRED EMBODIMENTS

Figure 4:
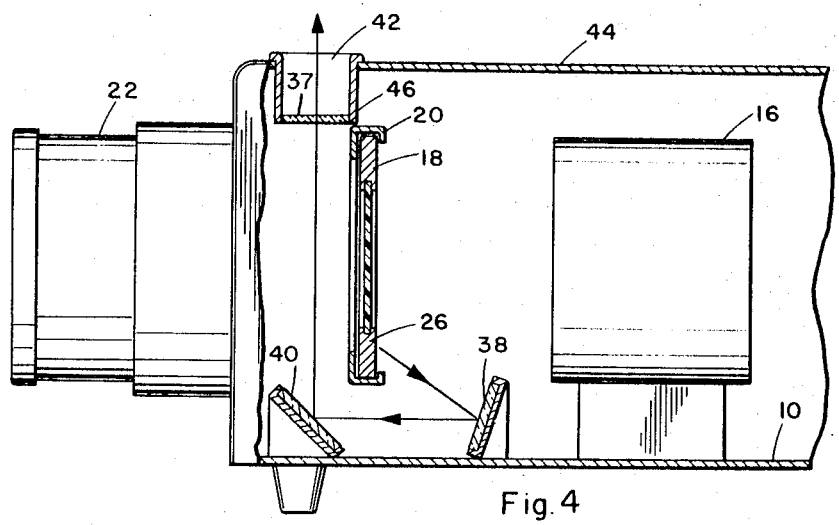
FIGURE 4 is a view similar to a portion of FIGURE 1, but showing an alternative viewing position.

The projector structure shown is typical in the arrangement of light source, slide holder and optics but features such as slide feed mechanisms, magazines and accessories not essential to the present disclosure have been omitted, since these can vary considerably.

Several types of projectors have slide magazines mounted on top and the operating controls at one side, where the operator is positioned. The structure shown in FIGURES 1-3 is adapted to this layout and provides a title viewing position at the side. The projector is constructed on a base 10 within a casing 12, the essential features including a lamp 14, the light from which is concentrated through a condenser 16 to illuminate a slide 18 in a slide holder 20, the image being projected through a lens 22 at the front of the projector. In order to provide adequate illumination for all slides, the area illuminated normally covers the entire border or frame of the slide and it is this feature which makes the title viewer practical.

Immediately below and to the rear of slide holder 20 is a first mirror 24, inclined rearwardly from the vertical and also angularly disposed horizontally relative to the slide holder, to direct an image of the lower portion of slide 18 to the side of the projector. As indicated in broken outline in FIGURE 3, a title area 26 is located on the lower rear portion of the slide frame, as oriented in projection position. A title or descriptive matter may be written directly on the slide or applied on a label. Mirror 24 is sufficiently large to reflect an image of the entire title area 26. Adjacent the side wall 28 of casing 12 is a second mirror 30 positioned to receive the reflected image from mirror 24, and being inclined outwardly from the vertical to direct the image angularly upwardly and outwardly through a viewing opening 32 in the side wall. A suitable shield 34 may be fiitted inside opening 32 to shield the operator from the direct glare of the projection light. The mirrors can be held in any suitable frame 36, or individual supports which will maintain alignment.

In the tested arrangement shown in FIGURES 1-3, it will be noted that the mirrors are also inclined from the horizontal plane of base 10, in order to bring the final image into proper planar alignment for the viewer. The actual angles involved in the mirror alignment will depend on the relative positions of the slide and the viewing opening and cannot be specifically defined. It may also be necessary to use special positioning of the mirrors to avoid existing structure in the projector, but the general arrangement will be as shown. Since the illumination of the title area is by the high intensity projection lamp the image will be very clear and, due to the short optical path, no magnification is necessary. However, the intensity of the light from the projection lamp makes it desirable to use an intensity reducing filter, preferably between the second mirror and the eye, so that the image is viewed through the filter. Such a filter 37 is shown installed immediately inside viewing opening 32 in FIGURE 3, the filter being supported in any suitable manner depending on the adjacent structure.

For a projector having a side mounted magazine, or other structure which would make a side viewing opening impractical, the viewing opening can be located in the top of the projector, as in FIGURE 4. In this arrangement a first mirror 38 is mounted below and to the rear of slide holder 20, parallel to the slide holder transversely but inclined from the vertical to reflect an image of title area 26 underneath the slide holder. Forward of slide holder 20 is a second mirror 40 transversely parallel to mirror 38, but inclined to the vertical to direct the reflected image upwardly through a viewing opening 42 in the top portion 44 of the projector. A shield 46 may be fitted around the opening to block out direct glare from the projection light and an intensity reducing filter 37 may be installed in the lower end of the shield.

Figure 5:
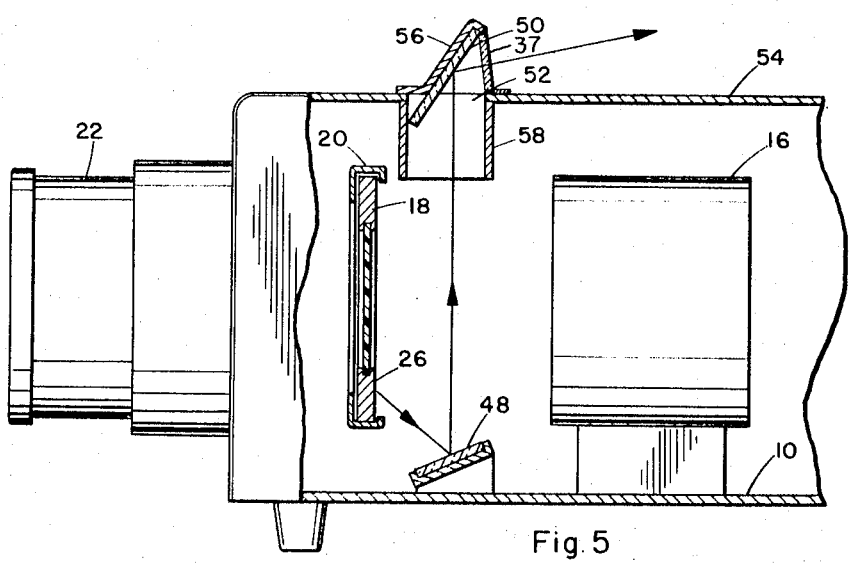
FIGURE 5 is a similar view showing a further alternative viewing position.

In a projector which is constructed so that the convenient operating position is at the rear, the configuration shown in FIGURE 5 may be used. A first mirror 48 is located below and to the rear of slide holder 20 and laterally parallel thereto, but is inclined from the vertical to direct an image of title area 26 upwardly behind the slide holder. A second mirror 50 is mounted in a viewing opening 52 in the top portion 54 of the projector and is inclined to direct the reflected image to the rear and slightly upwardly to a convenient eye level position. The arrangement is similar to that of a simple periscope. Mirror 50 is held in a hood bracket 56 and a shield 58 is fitted in viewing opening 52 to reduce glare. In this insance the filter 37 may be secured in the rear portion of hood bracket 56.

In each instance the entire optical system for viewing the title is composed of two flat mirrors, which can be low cost rear surfaced mirrors, and a simple filter. It will be evident that the mirrors can be disposed in a variety of positions to direct the image through a convenient opening, the arrangements shown being typical for the more common types of projectors.

Certain variations conceived include substitution of prisms for mirrors, and another variation, though not necessary to illustrate, envisages placement of the first mirror forward of the slide holder to reflect descriptive matter on the front side of a slide border, to a second mirror, for re-inversion and readability by an operator.

I claim:

1. A title viewer for a slide projector having a light source, a projection lens, and a slide holder between said light source and said projection lens in which a slide is held in projection position with border portions of the slide illuminated, the title viewer comprising:
   reflective means including a first mirror and a second mirror mounted on the projector;
   the first mirror reflecting an image of an illuminated border portion of a slide onto the second mirror;
   said projector having a viewing opening through which said reflective means is directly visible;
   a shield protecting said viewing opening from light directly from said light source; and
   a light intensity reducing filter in said viewing opening.

2. The structure according to claim 1, wherein said viewing opening is in a side of the projector at the operator's position, said first mirror being laterally diagonal to said slide holder to direct the image to the side, and said second mirror being inclined to the vertical to direct the image outwardly and upwardly through the viewing opening.

References Cited

UNITED STATES PATENTS

| | | | |
|---|---|---|---|
| 2,472,850 | 6/1949 | Plant | 240—46.59 |
| 2,879,337 | 3/1959 | Layng | 240—46.57 X |
| 3,390,607 | 7/1968 | Wills | 88—24 |

NORTON ANSHER, Primary Examiner

R. M. SHEER, Assistant Examiner

U.S. Cl. X.R.

353—78